United States Patent

Shirahata et al.

[11] Patent Number: 5,271,882
[45] Date of Patent: Dec. 21, 1993

[54] BLOW MOLDING PROCESS WITH SHEET INTERPOSED BETWEEN MOLD AND PRODUCT BEING MOLDED

[75] Inventors: Itaru Shirahata; Toshio Hirose, both of Oobu, Japan

[73] Assignee: Tokai Kogyo Kabushiki Kaisha, Oobu, Japan

[21] Appl. No.: 989,739

[22] Filed: Dec. 10, 1992

Related U.S. Application Data

[63] Continuation of Ser. No. 188,360, Nov. 6, 1991.

[30] Foreign Application Priority Data

Nov. 9, 1990 [JP] Japan ................... 2-304653

[51] Int. Cl.⁵ .................. B29C 49/04; B29C 49/62
[52] U.S. Cl. ................... 264/509; 264/316; 264/540; 425/812
[58] Field of Search ............... 264/509, 512, 515, 516, 264/523, 526, 540, 281, 293, 316; 425/385, 403, 503, 522, 532, 812

[56] References Cited

U.S. PATENT DOCUMENTS

| | | | |
|---|---|---|---|
| 3,072,969 | 1/1963 | Du Bois | 264/526 |
| 3,474,498 | 10/1969 | Happes | 264/509 |
| 3,550,197 | 12/1970 | Szajna et al. | 264/509 |
| 3,809,521 | 5/1974 | LaFosse | 425/326 B |
| 4,059,471 | 11/1977 | Haigh | 264/523 |
| 4,418,033 | 11/1983 | Hatakeyama | 264/509 |
| 4,479,770 | 10/1984 | Slat et al. | 264/509 |
| 4,639,341 | 1/1987 | Hanamoto et al. | 364/509 |
| 4,857,258 | 8/1989 | Le Doux et al. | 264/515 |

FOREIGN PATENT DOCUMENTS

| | | | |
|---|---|---|---|
| 48-9579 | 3/1973 | Japan | 264/515 |
| 56-084925 | 7/1981 | Japan | 264/523 |
| 59-206241 | 11/1984 | Japan | |
| 60-143159 | 7/1985 | Japan | |
| 61-76343 | 4/1986 | Japan | 264/523 |
| 62-4057 | 1/1987 | Japan | |
| 63-22123 | 6/1988 | Japan | |
| 63-252718 | 10/1988 | Japan | 264/509 |
| 64-24722 | 1/1989 | Japan | |
| 1-196324 | 8/1989 | Japan | |
| 2-018026 | 1/1990 | Japan | 264/509 |
| 2-57317 | 2/1990 | Japan | |
| 2-14994 | 4/1990 | Japan | |
| 1227083 | 3/1971 | United Kingdom | |

Primary Examiner—Catherine Timm
Attorney, Agent, or Firm—Oblon, Spivak, McClelland, Maier & Neustadt

[57] ABSTRACT

A process for making a blow molded product which includes the steps of positioning a sheet having a surface pattern which is incompatible with a parison in a mold for blow molding; extruding a softened parison of a synthetic resin from a die head; holding the parison in the mold and blowing gas into the parison to be expanded to form a blow molded product with a surface feature of the sheet reproduced on the blow molded product; and separating the sheet and the blow molded product from each other. An apparatus used for the process is provided with a mold defining a cavity for blow molding, a die head for extruding a parison of a synthetic resin into said mold, a sheet positioned between the mold and the parison which is formed an effective surface thereon and incompatible with the material of the parison, a gas blowing device for blowing gas into the parison to form a blow molded product, a sheet supply device for supplying a sheet in the cavity of the mold, and a sheet takeup device for taking up the sheet from the mold after blow molding.

13 Claims, 7 Drawing Sheets

BLOW MOLDING PROCESS WITH SHEET INTERPOSED BETWEEN MOLD AND PRODUCT BEING MOLDED

This application is a continuation of application Ser. No. 07/788,360, filed on Nov. 6, 1991, now abandoned.

BACKGROUND OF THE INVENTION

1. Field of the Invention

This invention relates to a process and an apparatus for making a blow molded product, such as a hollow molding for an automobile.

2. Description of the Prior Art

Extrusion or injection molding has been a typical method for making a molding as a decorative or protective part of an automobile, but blow molding has also come to be employed for that purpose.

FIG. 8 shows a molding made by a known blow molding process. It is a blow molded product 8 comprising a main body 81 having a hollow interior 82. The hollow interior 82 provides a shock absorbing function and also contributes to reducing the weight of the molding 8 as a whole. That is why the molding has come to be made by blow molding.

FIGS. 9 and 10 show a known mold 9 which is used for making the blow molded product 8. The mold 9 comprises a core plate 91 and a cavity block 92 which define a cavity therebetween when they are put together. The cavity is so shaped as to define the shape of the blow molded product 8. The core plate 91 has a gas blowing device 93 and a gas blowing needle 931 which face the cavity. The cavity block 92 has a cavity surface 920 provided with a plurality of air vent holes 924, and is also provided with an air passage 925 and an air vent pipe 926 to which the air vent holes 924 are connected by the air passage 925. The core plate 91 and the cavity block 92 are supported on retainer plates 911 and 921, respectively.

The blow molded product 8 is formed from a parison 80 of a softened synthetic resin which is extruded into the space between the core plate 91 and the cavity block 92 which have been separated from each other. After the parison 80 has been extruded, the mold is closed. The blowing needle 931 is pierced through the wall of the parison 80 into its hollow interior 801, and air is blown through the needle 931 into the hollow interior 801 to hold the outer surface of the parison 80 against the surface of the cavity. The parison 80 which has been expanded to the desired shape is cooled to yield the blow molded product 8 as shown in FIG. 8.

When air has been blown into the parison 80, the air remaining in the cavity between the parison 80 and the cavity surface 920 is allowed to flow out through the air vent holes 924, the air passage 925 and the air vent pipe 926, whereby the parison 80 is brought into intimate contact with the cavity surface 920, as shown in FIG. 10.

The cavity surface 920 is usually embossed to form an embossed or grained surface on the blow molded product 8, as shown in FIG. 10. The grained surface makes the blow molded product 8 look as if it were of leather, or gives it an ornamental feature. It has also been usual to coat the blow molded product with a paint to improve its appearance.

The manufacture of blow molded products is described in, for example, Japanese Patent Application Laid-Open No. 206241/1984 and Japanese Utility Model Publication No. 22123/1988.

There has been growing a demand for a blow molded product having a highly lustrous surface. There is known a process which employs a mold having a mirror finish on its cavity surface for making a blow molded product having a highly lustrous surface. The mold is preheated to a high temperature to heat and melt the surface of a parison, and is cooled to cool it. The heating and cooling of the parison, however, result in a longer molding time and therefore a lower degree of productivity. The apparatus which are required for heating and cooling the mold, and for controlling its temperature, necessarily add to the cost of manufacture. The mirror finish on the cavity surface calls for a great deal of labor and time.

The mirror finish causes intimate contact between the softened surface of the parison and the cavity surface when the parison has been expanded. This makes it difficult to vent air from between the parison and the cavity surface. If the cavity surface is embossed, as shown at 920 in FIG. 10, it may be relatively easy to vent such air, but it is often the case that the direct contact of the softened surface of the parison with the embossed cavity surface disables such air to escape.

The incomplete removal of air results in the formation of concavities, or other defects in the surface of a blow molded product. This is the case with a product having an embossed surface, too, though the embossed surface may make any such defect less noticeable.

The direct contact of the parison with the cavity surface of the mold presents a number of problems. Any defect that the cavity surface may have is reproduced in the surface of a blow molded product. The softened material in the surface of the parison protrudes into the air vent holes, as shown at 924 in FIG. 9, and forms small projections on the surface of a blow molded product.

The known process as described above increases the manufacturing cost due to the process of heating and cooling the mold for a highly lustrous surface, and causes defects in the surface of a blow molded product resulted from incomplete removal of the air remained between the parison and the cavity surface. Those defects in the surface might occur when reproducing an embossed surface of the blow molded product.

It has, therefore, been difficult to make a blow molded product having a highly lustrous surface presenting a good and pleasing appearance at a low cost.

SUMMARY OF THE INVENTION

Under these circumstances, it is an object of this invention to provide a process which can easily make a blow molded product having a highly lustrous surface, or a good and pleasing appearance at a low cost.

It is another object of this invention to provide an apparatus which is suitable for use when the process of this invention is carried out.

This invention provides a process for making a blow molded product comprising the steps of positioning a thin sheet having a surface pattern which is incompatible with a parison in a mold for blow molding; extruding a softened parison of a synthetic resin from a die head; holding the parison in the mold and blowing gas into the parison to be expanded to form a blow molded product with a surface feature of the sheet reproduced on the blow molded product; and separating the sheet and the blow molded product from each other.

According to a salient feature of this invention, the thin sheet is positioned in the mold for blow molding, and the surface of the sheet is reproduced on the blow molded product, then the sheet and the blow molded product are separated from each other. That is, blow molding is carried out with the sheet positioned between the parison and cavity block of the mold.

The sheet has an effective surface having an ornamental pattern, or appearance to be reproduced on the blow molded product.

The sheet preferably has a thickness of 100 to 300 microns. If its thickness is smaller than 100 microns, the sheet is likely to contact the cavity surface so closely that air may be trapped between the sheet and the cavity surface and form a defective surface on the blow molded product. If its thickness exceeds 300 microns, the sheet may be too thick to fit the cavity surface and form on the blow molded product a desired surface contour defined by the cavity surface.

The effective surface is determined according to desired surface characteristics. For example, such mold having a mirror finish or embossed pattern is employed for making a blow molded product with a highly lustrous surface and an embossed surface, respectively.

The sheet is a film, sheet or strip of a material which is incompatible with the material of the parison. More specifically, the sheet may, for example, be a film of polyester, nylon, polytetrafluoroethylene (Teflon), polyvinyl fluoride, or an ethylene-fluoroethylene copolymer, or a laminated film of polyester and polyvinyl fluoride. A sheet of polyvinyl fluoride or Teflon can, for example, be used if the parison is of polypropylene, or a sheet of polyester or nylon if the parison is of polyvinyl chloride. Other combinations are, of course, possible. Moreover, the sheet is required to withstand the temperature of the parison which is a still hot and soft tubular body of a synthetic resin.

The sheet has an effective surface having an ornamental pattern, or appearance to be reproduced on the blow molded product. The sheet is positioned near the cavity block of the mold so that, when the parison has been extruded into the mold, the sheet may stay between the parison and the cavity block, and so that its effective surface may face the parison. The sheet is separated at removing the blow molded product from the mold or after such removal.

This invention provides an apparatus for making a blow molded product comprising a mold defining a cavity for blow molding, a die head for extruding a parison of a synthetic resin into the mold, a gas blowing device for blowing gas into the parison to form a blow molded product, a sheet supply device for supplying a sheet in the cavity of the mold, and a sheet takeup device for taking up the sheet from the mold after blow molding.

As the aforementioned two devices, for example, a rotary sheet supplier winding the sheet around and sheet takeup device can be used, respectively as shown in FIG. 1.

The sheet may be preliminary cut to the size needed for the mold surface. Then it is positioned and held by the mold for blow molding as shown in FIG. 6.

The process and apparatus of this invention are useful for making a wide variety of blow molded products including moldings and bumpers for automobiles, bottles or containers, and edge protectors for desks.

In a process of this invention, prior to molding, the sheet is positioned in the mold. It is so set to be faced on a part requiring a highly lustrous or an embossed surfaces.

A parison is extruded from a die head into the mold to be held thereby. Gas is blown into the parison to form a blow molded product with a feature of the sheet surface reproduced thereon. Then the sheet is separated from the blow molded product, thereby obtaining the product having desired surface appearance such as a highly lustrous surface.

The sheet keeps the parison from contacting the cavity surface, or the inner surface of the cavity block, and thereby makes it possible to overcome any of the problems which have resulted from their direct contact. The air which is present between the sheet and the cavity surface is easy to vent. Therefore, the blow molded product has a surface which is free from any defects, such as concavities, or unevenness produced by a nonuniform flow of the resin, which would occur if any air remained between the parison and the cavity surface. Moreover, the surface of the product is free from any projection formed by the protrusion of the parison material into air vent holes, since the parison is kept from contacting the cavity surface in which the air vent holes are open. Therefore, the blow molded product has a highly lustrous, or embossed, or otherwise ornamental surface produced by the effective surface of the sheet with which the parison has been brought into contact.

This invention does not call for the heating of the mold to produce a highly lustrous surface on the blow molded product. It eliminates the necessity for any heating, cooling, or temperature controlling device and thereby enables a reduction in the manufacturing cost of the blow molded product.

This invention is so constructed to position the sheet of a continuous strip between a sheet supply device and a sheet takeup device through the mold. After blow molding, the sheet is separated from the blow molded product to be rewound on the takeup device. By this a new portion of the sheet is unwound from the supply device to be automatically fed into the cavity, resulting in continuous supply and easy positioning of the sheet.

Therefore, the process of this invention facilitates to reproduce a good and pleasing appearance on the blow molded product and to reduce the manufacturing cost.

According to a preferred aspect of this invention, the sheet is a continuous strip which is easy to feed into the mold automatically to supply a new effective surface for each blow molding operation. This arrangement improves the efficiency of each blow molding operation and enables a further reduction in the cost of manufacture.

Other features and advantages of this invention will become apparent from the following description and the accompanying drawings.

DETAILED DESCRIPTION OF THE INVENTION

A salient feature of this invention resides in the use of a sheet of an appropriate material which is positioned in a mold for keeping a parison from contacting a cavity surface, and for producing a desired ornamental pattern, or appearance on a blow molded product.

EMBODIMENT 1

The invention will now be described more specifically with reference to the drawings. Reference is first made to FIGS. 1 to 5 showing a process and an apparatus which embody this invention.

Figure 8:
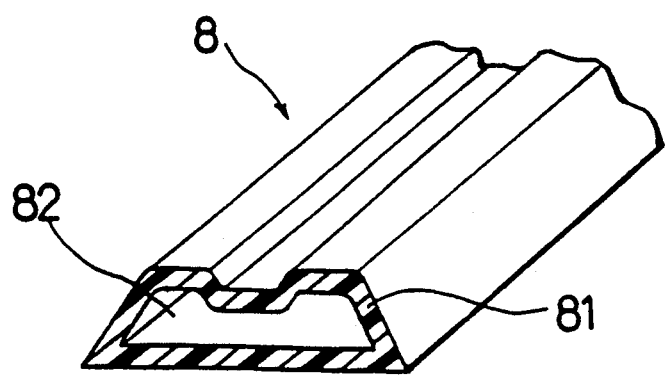
FIG. 8 is a fragmentary perspective view of a blow molded product known in the art.
Figure 9:
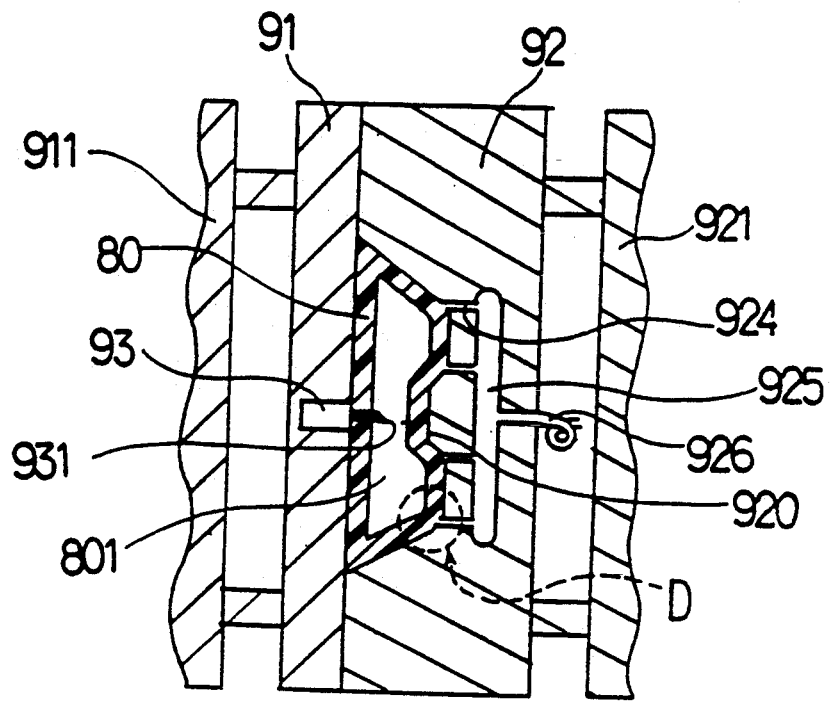
FIG. 9 is a transverse sectional view of a known mold used for making the product shown in FIG. 8.
Figure 10:
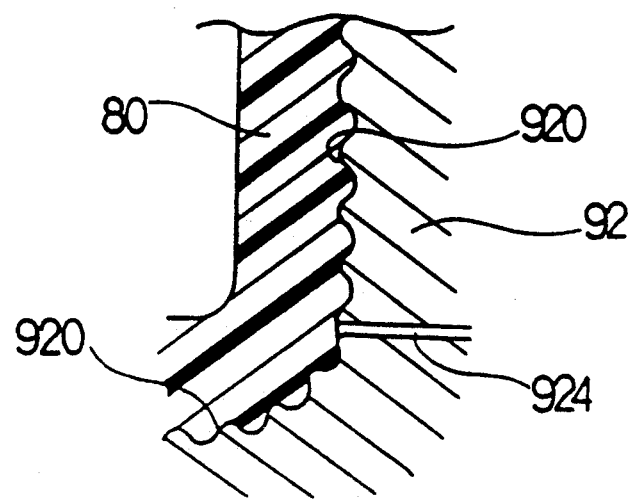
FIG. 10 is an enlarged view of part D of FIG. 9.

This embodiment relates to a process for making a blow molded product 8 as shown in FIG. 8. The apparatus comprises a blow mold 9 defining a cavity, a die head 73 for extruding a parison 80 of a synthetic resin into the mold 9, and a device 93 for blowing gas into the parison 80. It further includes a sheet supply device 2 for supplying a sheet 1 into the mold 9, and a sheet takeup device 3 for collecting the sheet 1 from the mold 9.

The mold 9 comprises a core plate 91 for forming the bottom of a blow molded product 8, and a cavity block 92 for forming its outer surface, as is the case with any known mold. The core plate 91 and the cavity block 92 are supported on retainer plates 911 and 921, respectively, and hydraulic cylinders 916 and 926 are connected to the retainer plates 911 and 921, respectively, for moving the core plate 91 and the cavity block 92, respectively, to open and close the mold 9. A pair of parison pinchers 917 and 927 facing each other and each comprising a spring are fastened to the lower ends of the core plate 91 and the cavity block 92, respectively.

The die head 73 is situated above the mold 9. A molding machine 72 is connected to the die head 73 for melting a synthetic resin feedstock 800 and supplying the softened resin to the die head 73. The die head 73 is provided with a device not shown, but used for supplying compressed air into the tubular parison 80 before the blowing of gas thereinto.

A pair of tension rolls 21 are provided near the sheet supply device 2, another pair of tension rolls 22 above the cavity block 92, and still another pair of tension rolls 32 below the cavity block 92. The tension rolls 21, 22 and 32 maintain a satisfactory amount of tension on the sheet 1 extending from the sheet supply device 2 to the sheet takeup device 3 through the mold 9. The sheet 1 in the mold 9 is so positioned that, when the parison 80 has been extruded into the mold 9, the sheet 1 may stay between the parison 80 and the cavity block 92.

The sheet 1 has a mirror surface for producing a highly lustrous surface on the blow molded product, and is of a material which is incompatible with the material of the parison 80.

Figure 2:
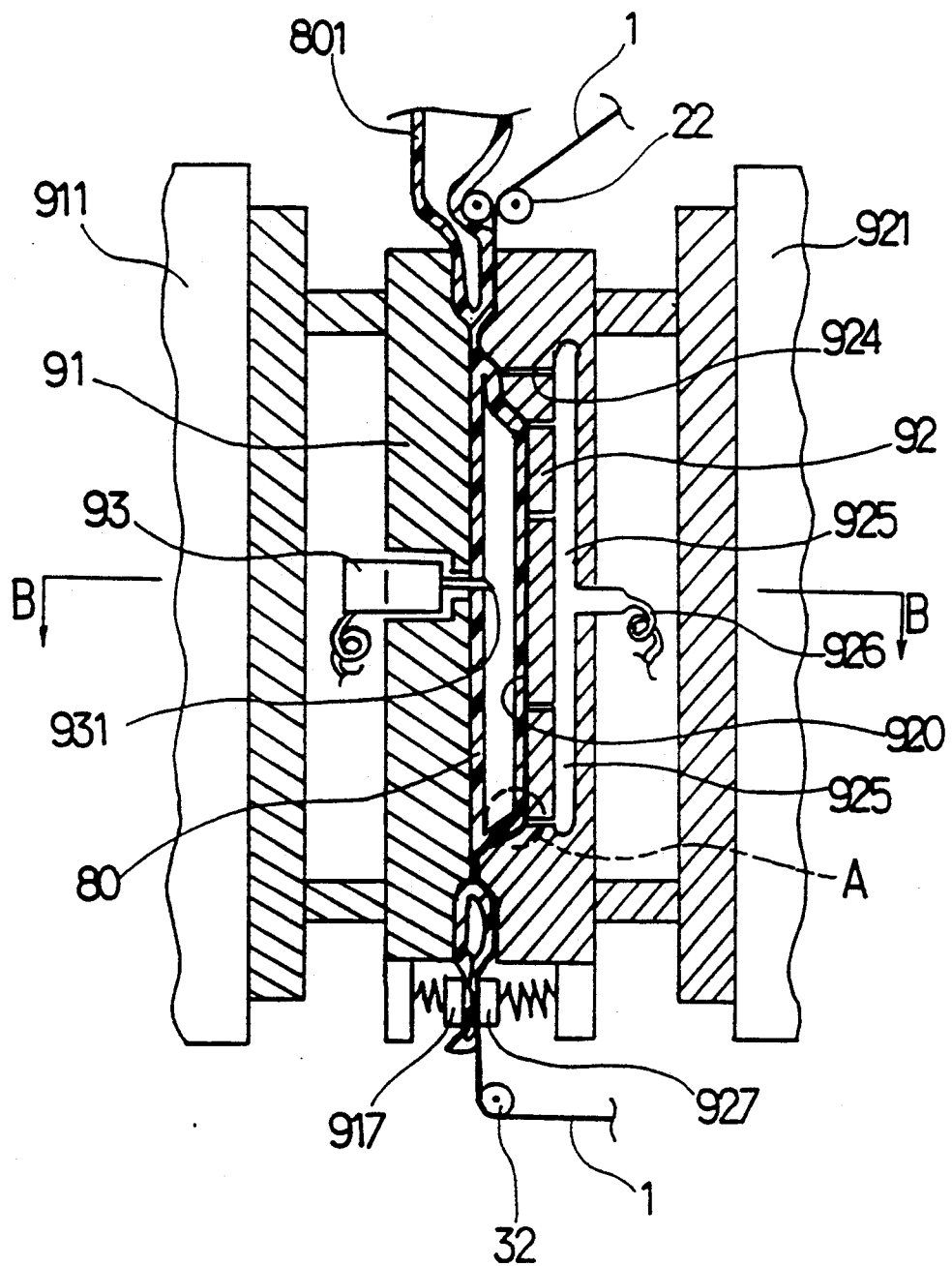
FIG. 2 is a sectional view of a mold forming a part of the apparatus shown in FIG. 1, and used for making a blow molded product.
Figure 3:
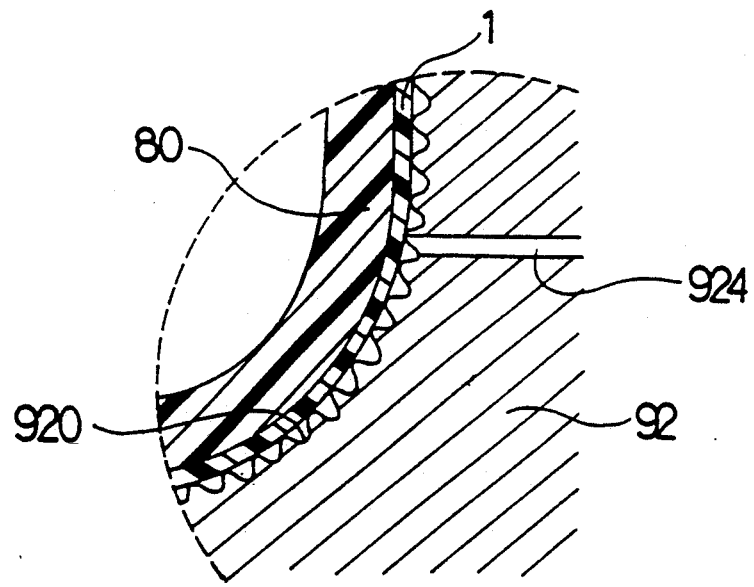
FIG. 3 is an enlarged view of part A of FIG. 2.
Figure 4:
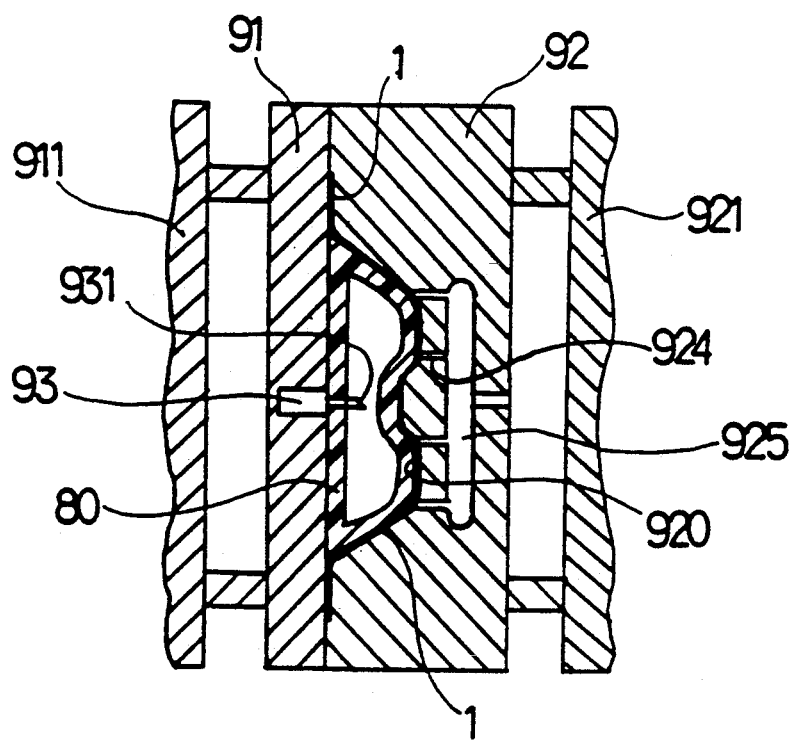
FIG. 4 is a sectional view taken along the line B—B of FIG. 2.

The gas blowing device 93 is provided in the core plate 91. The cavity block 92 is provided with air vent holes 924, an air passage 925, and an air vent pipe 926, as shown in FIG. 2. The cavity block 92 has an embossed or wrinkled cavity surface 920, as shown in FIG. 3. The wrinkled cavity surface 920 enables the effective removal of air from between the sheet 1 and the cavity surface 920, as will hereinafter be described in further detail.

Figure 1:
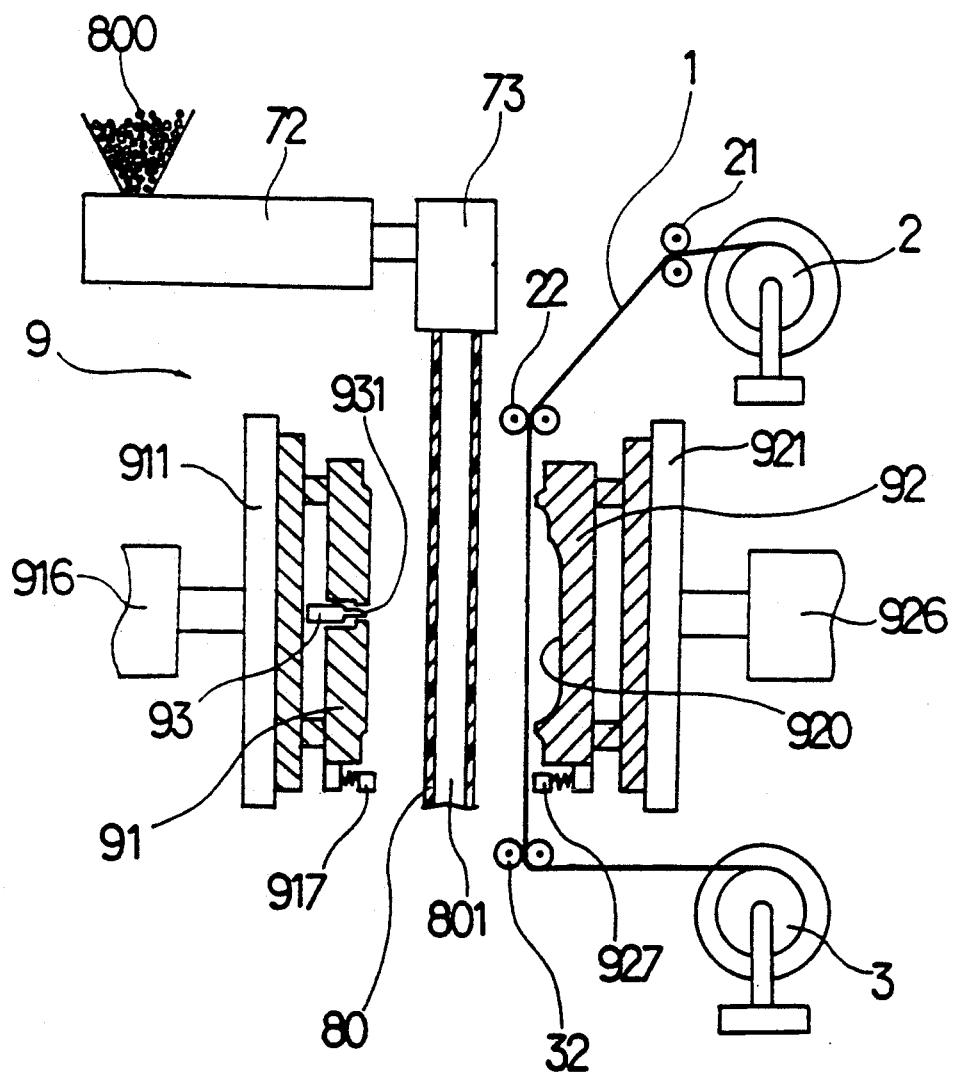
FIG. 1 is a front elevational view, partly in section, of an apparatus embodying this invention and used for carrying out a process embodying this invention.

Referring now to the process, the sheet 1 is positioned in the mold 9, while it is open, as shown in FIG. 1. The parison 80 is extruded from the die head 73 into the mold 9 between the sheet 1 and the core plate 91. The hollow interior 801 of the parison 80 is supplied with compressed air through the die head 73. The hydraulic cylinders 916 and 926 are actuated to move the core plate 91 and the cavity block 92 toward each other to close the mold 9, whereupon the parison 80 is held between the core plate 91 and the cavity block 92 near the top and bottom of the mold 9 and the lower end of the parison 80 is held between the parison pinchers 917 and 927, as shown in FIG. 2.

The gas blowing device 93 has a needle 931. The needle 931 is pierced through the wall of the parison 80, and compressed air is blown into the hollow interior 801 of the parison 80 through the needle 931 to expand the parison 80. The expanded parison 80 has its outer peripheral surface brought into contact with the inner surface of the core plate 91 and the sheet 1, and the sheet 1 is in turn brought into contact with the cavity surface 920 of the cavity block 92, whereby the features of the inner surface of the core plate 91 and of the effective surface of the sheet 1 are reproduced on the outer peripheral surface of the parison 80.

When the parison 80 has been expanded, the air confined between the sheet 1 and the cavity surface 920 is vented through the air vent holes 924, the air passage 925 and the air vent pipe 926. The sheet 1 and the finely rugged, or wrinkled cavity surface 920 has therebetween clearances which facilitate the escape of air into the air vent holes 924. On the other hand, the concavities in the rugged cavity surface 920 holds air which forms a cushion for the sheet 1 and thereby prevents the ruggedness of the cavity surface 920 from being reproduced on the parison 80 through the sheet 1.

Figure 5:
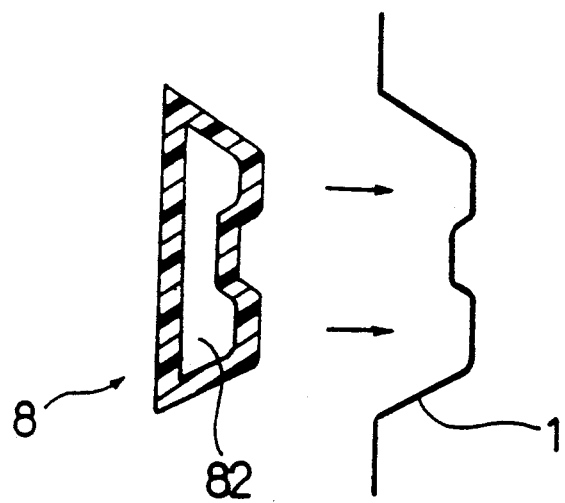
FIG. 5 is a view showing the separation of a sheet from a blow molded product made as shown in FIG. 4.

After the expanded parison 80 has been allowed to cool and solidify to yield a blow molded product 8, the mold 9 is opened, and the blow molded product 8 is removed from the mold 9, while the sheet 1 is separated from the product 8, as shown in FIG. 5. The used portion of the sheet 1 which has been separated from the product 8 is rewound on the sheet takeup device 3, while a new portion of the sheet 1 is fed from the sheet supply device 2 into the mold 9 to make the mold 9 ready for the subsequent blow molding operation, as shown in FIG. 1.

The process as hereinabove described was employed for blow molding, for example, a parison of a polypropylene resin by using, for example, a sheet of polytetrafluoroethylene (Teflon) having a thickness of 250 microns. There was obtained a blow molded product having a highly lustrous surface produced by the smooth mirror surface of the sheet.

In the above described process, the sheet 1 is positioned between the cavity surface 920 and the parison 80 to keep them from contacting each other for blow molding. The air remained between the sheet 1 and the cavity surface 920 can be easily vented outside through the air vent holes 924. Particularly the cavity surface 920 is so formed to be finely rugged or wrinkled as shown in FIG. 3, thereby forming a clearance between the sheet 1 and the cavity surface 920, helping the air vent.

The air trapped in the concavities of the cavity surface 920 provides a shock absorbing function for the sheet 1, by which the ruggedness of the cavity surface 920 is not reproduced on the surface of the blow molded product 8.

Therefore the blow molded product 8 has a surface which is free from any defects, such as concavities, or unevenness produced by a non-uniform flow of the resin. The blow molded product 8 has a highly lustrous, or embossed, or otherwise ornamental surface produced by the effective surface (film surface) of the sheet 1 with which the parison 80 has been brought into contact.

This invention requires no process step of preheating the mold for a highly lustrous surface as is the case with any known process, resulting in manufacturing cost saving.

The above-described apparatus is so constructed to stretch the sheet 1 between the sheet supply device 2 and the sheet takeup device 3 to be subsequently fed after blow molding, resulting in easy positioning and supply of the sheet 1.

EMBODIMENT 2

Figure 6:
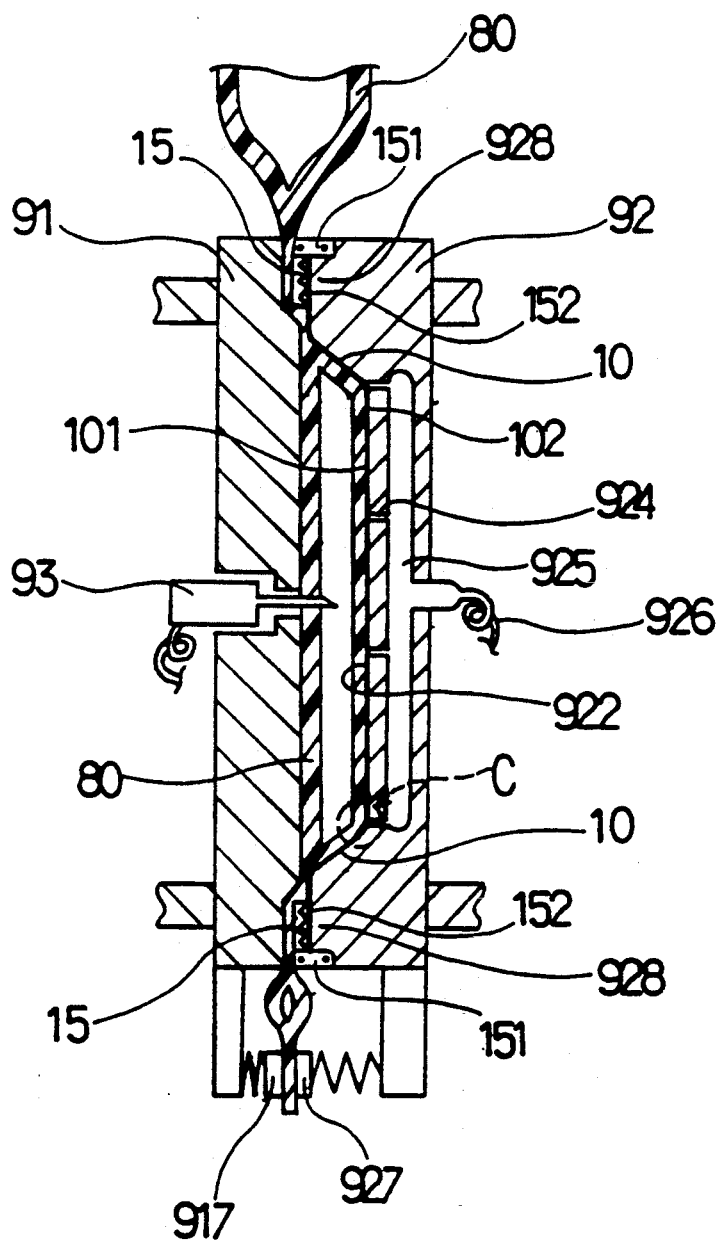
FIG. 6 is a fragmentary front elevational view, partly in section, of a different form of apparatus embodying this invention and used for carrying out a different form of process embodying this invention.
Figure 7:
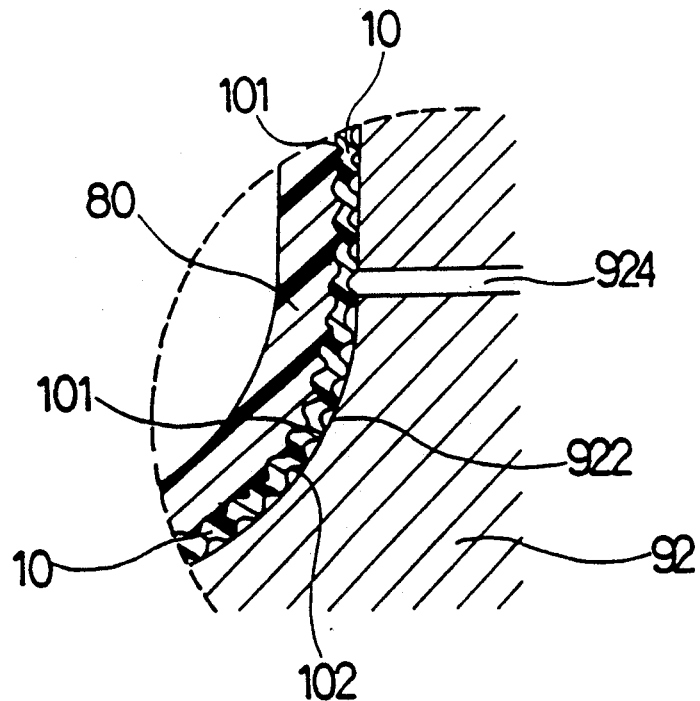
FIG. 7 is an enlarged view of part C of FIG. 6.

Attention is now drawn to FIGS. 6 and 7 showing modified forms of process and apparatus which embody this invention. In this embodiment, the apparatus includes a cavity block 92 having an even cavity surface 922 and the process is carried out by employing a sheet 10 having two rugged or embossed surfaces 101 and 102, of which 101 is the effective surface with which a parison 80 is brought into contact.

The sheet 10 is a discrete film of nylon having a thickness of 300 microns and knurled to form the rugged surfaces 101 and 102. The grooves forming each rugged surface have a depth of about 150 microns. The rugged surface 101 of the sheet 10 forms a feature to be reproduced.

The apparatus further includes a pair of L-shaped clamping members 15 supported rotatably on the cavity block 92 at the upper and lower ends 928, respectively, thereof. Each clamping member 15 has a base portion 151 attached rotatably to the cavity block 92, and a free toothed portion 152 which is rotatable to hold the sheet 10 fast to the upper or lower end 928 of the cavity block 92.

The sheet 10 is a discrete film instead of being a continuous strip. It is placed in the mold 9, and fastened to the cavity block 92 by the clamping members 15. After the parison 80 is extruded into the mold 9, the mold 9 is closed, and the parison 80 is expanded, whereby the embossed surface 101 of the sheet 10 is reproduced on the parison 80. The air which is trapped between the sheet 10 and the even cavity surface 922 is easily vented through the grooves in the rear surface 102 of the sheet 10 and through air vent holes 924. The expanded parison 80 yields a blow molded product 8 having an embossed surface produced by the effective surface 101 of the sheet 10, and free from any such defect as has hereinbefore been pointed out.

After the molded product is removed from the mold 9, the clamping members 15 are opened to release the sheet 10, and a new sheet is positioned in the mold 9 to make it ready for a new blow molding operation.

The blow molded product 8 obtained from this embodiment has an embossed surface reproduced by the rugged surface 101 of the sheet 10. The air remained between the cavity surface 922 and the sheet 10 can be easily vented, which causes no defects on the surface of the blow molded product, such as concavities, or unevenness produced by a non-uniform flow of the resin frequently occurred when using the known apparatus. The blow molded product 8, thus, has a good and pleasing embossed surface.

The process and apparatus under description are otherwise substantially identical to those which have been described with reference to FIGS. 1 to 4.

What is claimed as new and desired to be secured by Letters Patent of the United States is:

1. A process for making a blow molded product comprising the steps of:
   positioning a sheet having an effective surface having a surface pattern in a mold for blow molding, said mold having a roughened surface;
   extruding a softened parison of a synthetic resin from a die head;
   holding said parison in said mold and blowing gas into said parison, thereby expanding the parison to contact the effective surface and to form the blow molded product with the surface pattern of said sheet reproduced on said blow molded product;
   removing gas from said mold to thereby reduce deformation in the blow-molded product resulting from gas trapped between the parison and the mold, said gas removing step including removing gas through at least one port provided in said mold, and wherein said positioning sheet step includes positioning a sheet such that it covers said at least one port thereby preventing said port from causing a deformation in said blow molded product;
   said method further including providing as said sheet, a sheet having a thickness of 100 to 300 microns such that said sheet assumes a contour of the mold without allowing air to become trapped between the sheet and the mold, said thickness also allowing said sheet to assume the contour of the mold while preventing the blow-molded product from assuming the surface roughness of the mold in a portion of the mold covered by said sheet, said sheet thickness further preventing undesirable deformation of said blow molded product resulting from said at least one port; and
   separating said sheet and said blow molded product form each other.

2. A process as in claim 1, wherein said sheet has a mirror finish on its effective surface.

3. A process as in claim 1, wherein said sheet has an embossed effective surface.

4. A process as in claim 1, wherein a material of said sheet is selected from the group consisting of polyesters, nylons, poly-vinyl fluorides, and laminates of polyesters and polyvinyl fluorides.

5. The process of claim 1, wherein a material of said sheet is selected from the group consisting of polytetrafluoroethylene and ethylene-fluoroethylene copolymers.

6. A process as in claim 1, wherein said parison is formed of polypropylene and said sheet is formed of a material selected from the group consisting of polyvinyl fluorides.

7. The process of claim 1, wherein said parison is formed of polypropylene and said sheet is formed of polytetrafluoroethylene.

8. A process as in claim 1, wherein said parison is formed of polyvinyl chloride and said sheet is formed of a material selected from the group consisting of polyesters and nylons.

9. A process as in claim 1, wherein a needle of said gas blowing device is pierced through the wall of said parison and compressed air is blown into a hollow interior of said parison through said needle.

10. A process for making a blow molded product comprising the steps of:

positioning a sheet having a surface pattern in a mold for blow molding;

extruding a softened parison of a synthetic resin from a die head;

holding said parison in said mold and blowing gas into said parison to expand said parison to form the blow molded product with the surface pattern of said sheet reproduced on said blow molded product;

removing gas from said mold to thereby reduce deformation in the blow-molded product resulting from gas trapped between the parison and the mold, said gas removing step including removing gas through at least one port provided in said mold, and wherein said positioning sheet step includes positioning a sheet such that it covers said at least one port thereby preventing said port from causing a deformation in said blow molded product, and wherein said port is a vent through which air escapes as a result of the gas being blown into the parison during blow molding;

said method further including providing an interior surface of said mold with a rugged surface such that a clearance is formed between the sheet and recesses of said interior surface thereby allowing air to vent, and further wherein air trapped within recesses of said rugged surface provides a cushioning effect to thereby prevent said blow molded product from assuming the rugged surface of said mold, and separating said sheet and said blow molded product from each other.

11. The process of claim 10, wherein said step of positioning a sheet includes positioning a sheet having a thickness of 100–300 microns.

12. The process of claim 11, wherein said step of positioning said sheet includes positioning said sheet under tension in said mold.

13. A process for making a blow molded product comprising the steps of:

positioning a sheet having a surface pattern in a mold for blow molding;

extruding a softened parison of a synthetic resin from a die head;

holding said parison in said mold and blowing gas into said parison to expand said parison to form the blow molded product with the surface pattern of said sheet reproduced on said blow molded product;

removing gas from said mold to thereby reduce deformation in the blow-molded product resulting from gas trapped between the parison and the mold, said gas removing step including removing gas through at least one port provided in said mold, and wherein said positioning sheet step includes positioning a sheet such that it covers said at least one port thereby preventing said port from causing a deformation in said blow molded product, and further wherein said port is a vent through which air escapes as a result of the gas being blown into the parison during blow molding;

said method further including providing as said sheet, a sheet having a thickness of 100 to 300 microns and providing said mold with a roughened surface such that said sheet assumes a contour of the mold without allowing undesirable pockets of air to become trapped between the sheet and the mold, said thickness also allowing said sheet to assume the contour of the mold while preventing the blow-molded product from assuming the surface roughness of the mold in a portion of the mold covered by said sheet, said sheet thickness further preventing undesirable deformation of said blow molded product resulting from said at least one port; and separating said sheet and said blow molded product from each other;

wherein said step of positioning said sheet includes maintaining said sheet under tension within said mold while said parison is extruded, such that when said parison is extruded into the mold, the sheet is maintained between the parison and a cavity block of the mold.

* * * * *